July 14, 1942.  M. W. GANO, JR  2,289,644
VISOR
Filed April 14, 1941   2 Sheets-Sheet 1
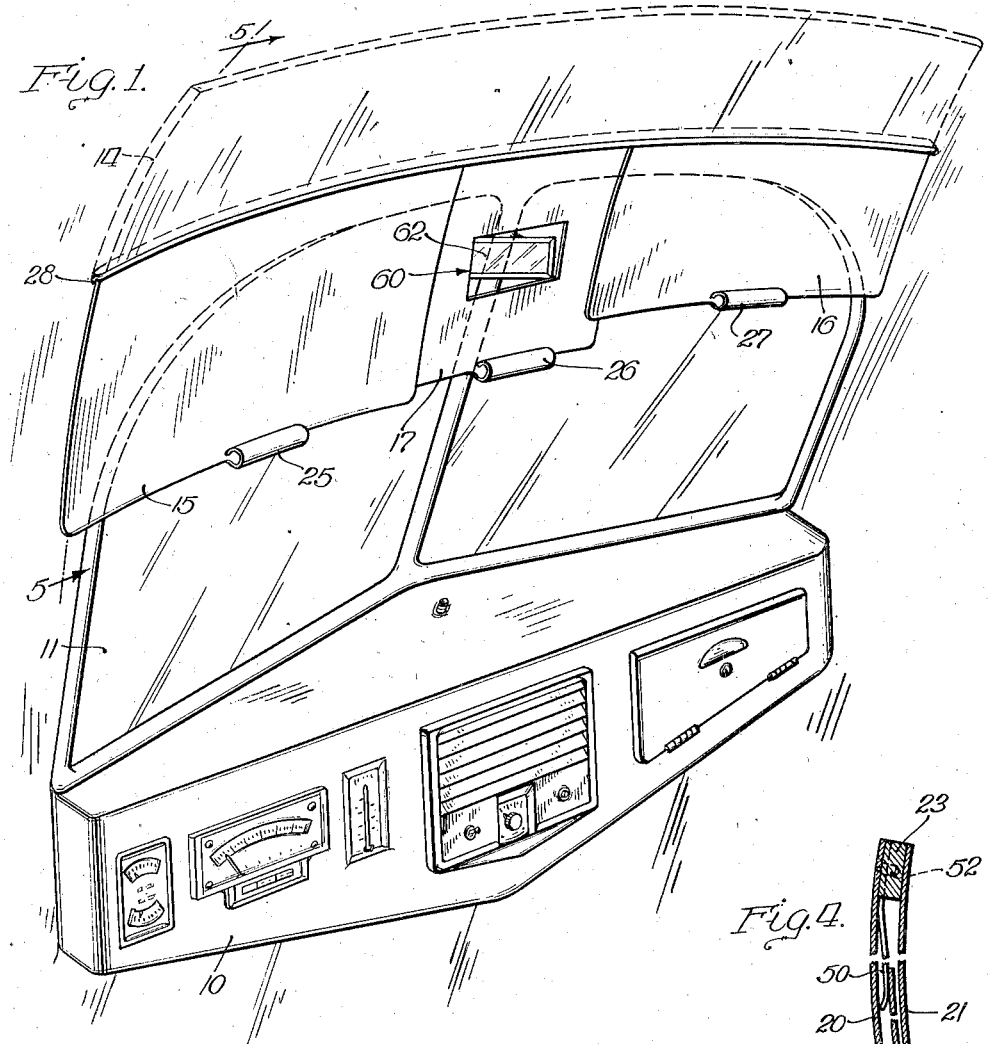
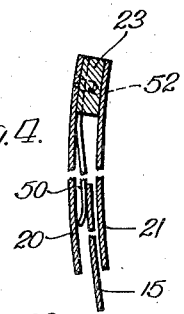
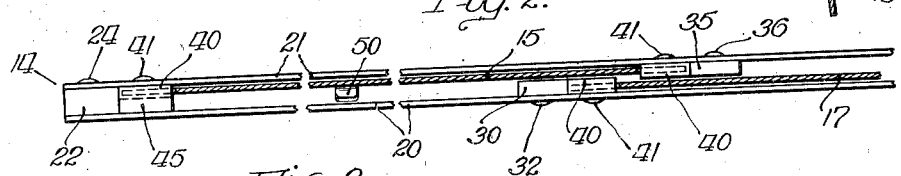
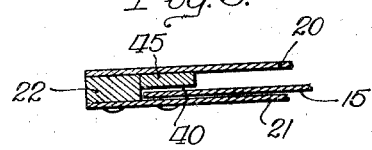
INVENTOR.
Merritt W. Gano, Jr.
BY
Brown, Jackson, Boettcher & Dienner
Attys.

July 14, 1942.　　　M. W. GANO, JR　　　2,289,644
VISOR
Filed April 14, 1941　　　2 Sheets-Sheet 2
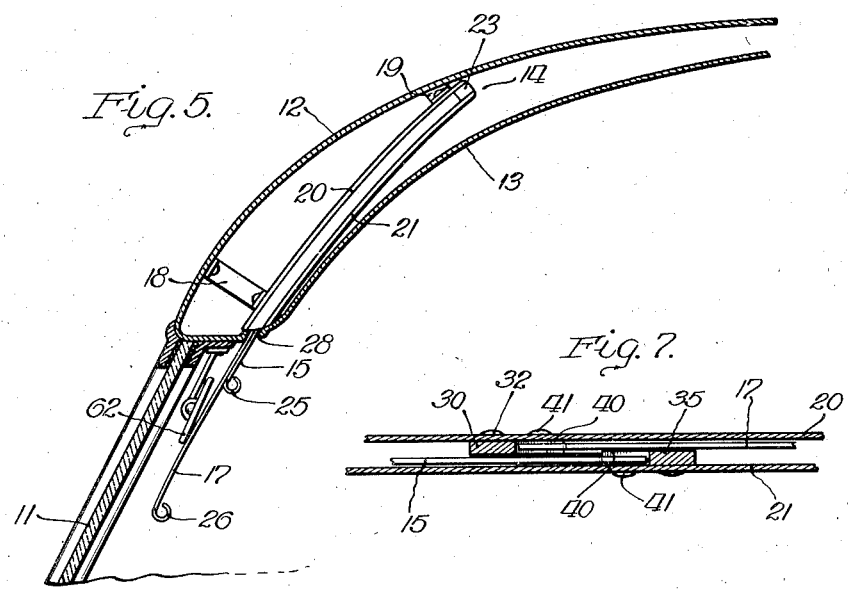
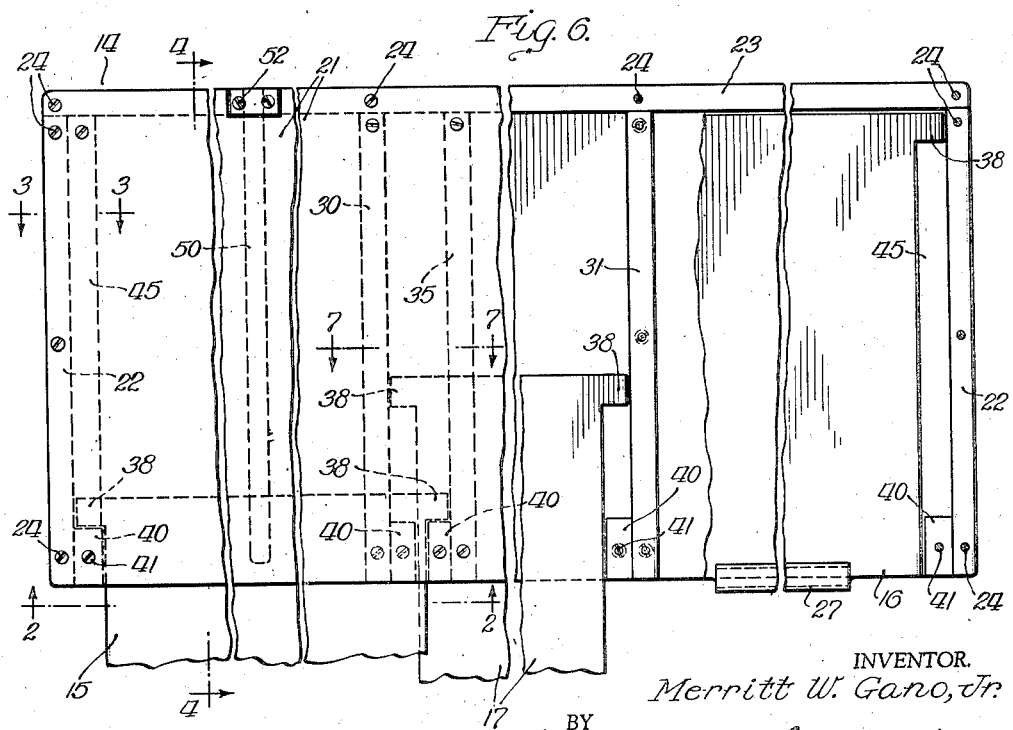
INVENTOR.
Merritt W. Gano, Jr.
BY
Brown, Jackson, Boettcher & Dienner
Attys.

Patented July 14, 1942

2,289,644

UNITED STATES PATENT OFFICE 2,289,644

VISOR

Merritt W. Gano, Jr., Denver, Colo.

Application April 14, 1941, Serial No. 388,415

15 Claims. (Cl. 296—97)

This invention relates to visors for motor vehicles and the like.

One of the main objects of the invention is to provide an improved sun visor that is better adapted to protect the vision—for example, when driving toward the sun, or from other objectionable light.

More particularly, the invention provides an improved visor comprising a plurality of visor members adapted for individual movement to extended shielding position and to retracted position. These visor members are adapted to be individually positioned in shielding position according to where the objectionable rays are entering the vehicle and without obstructing the driver's field of vision where there are no objectionable rays, and any pair or all of the visor members may be extended to shielding position to provide maximum protection against the objectionable rays.

It is also an object of the invention to provide an improved mounting for the visor and an improved formation of the visor that will lend itself to concealed positioning of the visor holder between the top and inner lining of the vehicle, and a compact device that may be installed with minimum clearances and in which, at the same time, the visor members will not be obstructed—for example, by the windshield—when moved to their extended shielding position; and also a device in which the visor members may be moved to position, for example, within the space between the top of the vehicle and the inner lining when not in use.

Another object of the invention is to provide a simple and inexpensive construction for accomplishing the results set forth, an improved holder for mounting and guiding the visor members in their movement between retracted and extended positions, and improved means for individually holding the visor members in their extended positions and in any position between their retracted and extended positions.

Further objects and advantages of the invention will appear from the following detailed description, taken in connection with the accompanying drawings, in which:

Figure 1 is a fragmentary perspective view of the dash and windshield of an automobile, looking from the inside, and showing an embodiment of the present invention in connection therewith;

Figure 2 is a fragmentary bottom view of the visor, partially in section, taken on the line 2—2 of Figure 6;

Figure 3 is a fragmentary section taken on the line 3—3 of Figure 6;

Figure 4 is a fragmentary section partially broken away and taken on the line 4—4 of Figure 6;

Figure 5 is a fragmentary section taken on the line 5—5 of Figure 1;

Figure 6 is an elevational view of the visor partially broken away and taken from the inside of the vehicle as the visor is viewed in Figure 1; and Figure 7 is a fragmentary section taken on the line 7—7 of Figure 6.

In the adaptation of the invention selected for illustration, the dash of the vehicle is indicated at 10, the windshield is indicated at 11, and the top 12 of the vehicle is shown as having a lining 13 spaced inwardly therefrom.

The visor comprises a holder 14 in which are mounted a pair of longitudinally spaced end visor members 15 and 16 and an intermediate visor member 17 for the space between the end visor members. The holder 14 is preferably mounted in concealed position between the top 12 and the inner lining at 13, and is shown as attached by brackets 18 and 19 to the inner side of the top 12.

The holder 14 supports the three visor members 15, 16, and 17 for individual sliding movement down into extended position to shield the driver's eyes from the sun or other objectionable rays and up into retracted and concealed position between the top 12 and the inner lining 13. The combined effective length of the three visor members 15, 16, and 17 is preferably such that when the three visor members are pulled down to their extended shielding positions, the shield extends across substantially the entire width of the windshield. The intermediate visor member 17 is preferably overlapped at its opposite ends by the end visor members to eliminate cracks or spaces between the visor members through which the objectionable rays might otherwise reach the eyes of the driver.

By mounting the three visor members 15, 16 and 17 for individual movement down into extended shielding position and up into retracted position, it is possible to position the visor members to intercept objectionable rays entering at either side or at the center of the windshield without unnecessarily obstructing the field of vision along the portions of the windshield where the sun's rays or other objectionable light is not entering the vehicle. For example, with the visor member 15 in downwardly extended position and the visor members 16 and 17 in their upper retracted positions, the rays of light are intercepted at the left hand side of the windshield without obstructing vision through the center and the other side of the windshield, and with the visor member 15 in its upper retracted position and one or both of the other visor members 16 and 17 in extended position the objectionable rays are intercepted along the positions where the visor members are extended without obstructing vision along the position where one or more of the visor members are in retracted position. In Figure 6 the left hand visor member 15 is shown in extended shielding position, with the intermediate or center visor member 17 in partially extended position and the right hand visor member 16 in retracted position.

The particular visor holder 14 selected for illustration comprises a pair of relatively thin plates 20 and 21 which may be made of lightweight sheet metal or any other suitable material. The opposite ends of the plates 20 and 21 are shown as spaced by end spacer strips 22, and their upper longitudinal edges are shown as spaced by a longitudinal spacer strip 23. The plates 20 and 21 are secured together with the spacer strips 22 and 23 secured in place marginally therebetween by suitable fastening elements 24. The fastening elements 24 may be in the form of screws, rivets, spot welding, or of any other suitable form. The spacer means, instead of being in the form of separate strips, may be struck out from the plates 20 and 21, or formed otherwise as desired.

The visor members 15, 16, and 17 may be in the form of relatively thin plates made of lightweight sheet metal or any other suitable material that will intercept or screen out the objectionable rays. Each visor member 15, 16, and 17 is shown as provided at its lower end with a finger piece 25, 26, and 27 respectively, these finger pieces being illustrated as downwardly extending tabs rolled up to the desired form, although this may, of course, vary. The lining 13 is shown as having a transversely extending slot 28 through which the visor members are moved to their extended and retracted positions.

For the purpose of guiding the intermediate visor member 17 between the plates 20 and 21, I have shown a pair of appropriately spaced guide and spacer strips 30 and 31 disposed between the plates 20 and 21 and secured, for example, to the outer plate 20 at 32. The ends of the visor members 15 and 16 not only overlap the ends of the intermediate visor member as already described, but they overlap the guide and spacer strips 30 and 31 for the intermediate visor member 17, and may be maintained spaced from the outer plate 20 by the strips 30 and 31. The visor members 15 and 16 are guided between the end spacer strips 22 and guide and spacer strips 35 disposed between the plates 20 and 21 and secured, for example, to the inner plate 21 at 36. The opposite ends of the intermediate visor 17 overlap the guide and spacer strips 35 as shown in Figure 2, and are maintained spaced from the inner plate 21 by the strips 35.

The inner end of each of the three visor members 15, 16, and 17 has lateral lugs 38 which engage stops 40 for limiting the movement of the respective visor members to their extended shielding positions. The stops 40 are secured at 41 between the plates 20 and 21 at the lower margins thereof. Spacer strips 45 may be provided at the outer ends of the visor members 15 and 16 for maintaining the outer ends of the visor members in position.

The holder 14 and the visor members 15, 16, and 17 are preferably curved in the direction of movement of the visor members between their extended shielding positions and their retracted positions. This curvature is highly desirable because it provides for properly positioning the visor members with respect to the windshield when in extended position, and eliminates without undue clearance the possibility of the lower ends of the visor members striking the windshield when extended. At the same time this curvature tends to bring the upper end of the holder and the upper ends of the visor members, when retracted, into the generally horizontal position in which the space between the top 12 and the lining 13 extends at the top of the vehicle. The visor members 15, 16, and 17 and the holder or track and guide means therefor need not be curved within the broader aspects of the invention.

While I have shown and described the holder 14 as comprising the spaced plates 20 and 21 and as of generally housing-like form, this may vary within the scope of the present invention. The holder may, for example, consist of merely a frame with tracks to hold and guide the visor members.

For the purpose of holding the visor members 15, 16, and 17 in their retracted positions, and to hold the visor members in any desired position between retracted and extended positions, as well as to make for smooth operation without any rattling, I provide three springs 50, one for each visor member 15, 16, and 17. These springs are shown as leaf springs which may be secured in place at their upper ends between the plates 20 and 21, as at 52, with the lower ends of the springs pressing against the respective visor members frictionally to hold the same in any extended position. This may, of course, vary.

I also contemplate providing the friction for holding the visor members in their retracted positions, and in any position between retracted and extended position, by making the curvature of the visor members different from the curvature of the holder 14 or tracks for holding and guiding the visor members in their movement between extended and retracted position.

The center or intermediate visor member 17 is shown as provided with an opening 60 through which the rear view mirror 62 may be viewed when the visor member 17 is in its extended shielding position.

While I have shown and described the invention as applied to the windshield of a motor vehicle, it is to be understood that the visor means may be used adjacent the side windows of the vehicle, or elsewhere, within certain aspects of the invention.

The visor of the present invention can also be made to be attached to any present car by removing the present shields and screwing or mounting the visor of the present invention to the present bracket mounts. In that case the visor may not be concealed behind the top lining.

Instead of providing the center visor member with an opening through which the rear view mirror 62 is adapted to be viewed, I contemplate using the inner surface of the center visor member as a rear view mirror, or applying a rear view mirror to the inner side of the center visor member for use when this member is in its downwardly extended position.

The embodiment of the invention shown in the drawings is for illustrative purposes only, and it is to be expressly understood that said drawings and the accompanying specification are not to be construed as a definition of the limits or scope of the invention, reference being had to the appended claims for that purpose.

I claim:

1. A visor for motor vehicles comprising a plurality of overlapping visor members, and means for supporting said visor members for individual and generally up and down sliding movement of the lower ends thereof into extended and retracted positions, said visor members overlapping in a direction generally laterally relative to their paths of sliding movement to extended and retracted positions and each being adapted to be extended and retracted while maintaining the lateral overlap of the visor members substantially uniform throughout all extended and retracted positions of the visor members.

2. A visor comprising a holder and a plurality of overlapping visor members each supported for individual sliding movement to extended position from said holder and to retracted position within said holder, said visor members overlapping in a direction generally laterally relative to their paths of sliding movement to extended and retracted positions and each being adapted to be extended and retracted while maintaining the lateral overlap of the visor members substantially uniform throughout all extended and retracted positions of the visor members.

3. A visor comprising a holder, a plurality of overlapping visor members each supported for individual sliding movement to extended position from said holder and to retracted position within said holder, and guide means carried by said holder for individually guiding said visor members to their extended and retracted positions, said visor members overlapping in a direction generally laterally relative to their paths of sliding movement to extended and retracted positions and each being adapted to be extended and retracted while maintaining the lateral overlap of the visor members substantially uniform throughout all extended and retracted positions of the visor members.

4. A visor comprising a holder and a plurality of overlapping visor members each supported for individual sliding movement to extended position from said holder and to retracted position within said holder, said visor members each being curved in the direction of movement between extended and retracted positions, said visor members overlapping in a direction generally laterally relative to their paths of sliding movement to extended and retracted positions and each being adapted to be extended and retracted while maintaining the lateral overlap of the visor members substantially uniform throughout all extended and retracted positions of the visor members.

5. A visor for motor vehicles comprising a pair of longitudinally spaced visor members, an intermediate visor member for the space between said longitudinal spaced visor members and having its opposite ends overlapped by the adjacent ends of said longitudinally spaced visor members, and means for supporting the longitudinally spaced and intermediate visor members for individual and generally up and down sliding movement of each of said visor members into downwardly extended position and into upwardly retracted position, said visor members overlapping in a direction generally laterally relative to their paths of sliding movement to extended and retracted positions and each being adapted to be extended and retracted while maintaining the lateral overlap of the visor members substantially uniform throughout all extended and retracted positions of the visor members.

6. A visor for motor vehicles comprising a pair of longitudinally spaced visor members, an intermediate visor member for the space between said longitudinally spaced visor members and having its opposite ends overlapped by the adjacent ends of said longitudinally spaced visor members, means for supporting the longitudinally spaced and intermediate visor members for individual sliding movement of each of said visor members into extended and retracted positions, and means for individually holding said visor members in their extended positions, said visor members overlapping in a direction generally laterally relative to their paths of sliding movement to extended and retracted positions and each being adapted to be extended and retracted while maintaining the lateral overlap of the visor members substantially uniform throughout all extended and retracted positions of the visor members.

7. A visor for motor vehicles comprising a pair of longitudinally spaced visor members, an intermediate visor member for the space between said longitudinally spaced visor members and having its opposite ends overlapped by the adjacent ends of said longitudinally spaced visor members, and means for supporting the longitudinally spaced and intermediate visor members for individual sliding movement of each of said visor members into extended and retracted positions, one of said visor members having an opening through which the rear view mirror is adapted to be viewed when said visor member is in extended shielding position.

8. A visor for motor vehicles comprising a pair of longitudinally spaced visor members, an intermediate visor member for the space between said longitudinally spaced visor members and having its opposite ends overlapped by the adjacent ends of said longitudinally spaced visor members, and means for supporting the longitudinally spaced and intermediate visor members for individual sliding movement of each of said visor members into extended shielding position and into retracted position, said visor members each being curved in the direction of movement between their extended and retracted positions, said visor members overlapping in a direction generally laterally relative to their paths of sliding movement to extended and retracted positions and each being adapted to be extended and retracted while maintaining the lateral overlap of the visor members substantially uniform throughout all extended and retracted positions of the visor members.

9. In combination with a vehicle having a top wall with an inner lining spaced inwardly therefrom, a visor holder mounted in concealed position within the space between said top wall and said lining, and a plurality of overlapping visor members supported by said holder for individual sliding movement into shielding position extending downwardly from said holder and into upwardly retracted position within the holder, said visor members overlapping in a direction generally laterally relative to their paths of sliding movement to extended and retracted positions and each being adapted to be extended and retracted while maintaining the lateral overlap of the visor members substantially uniform throughout all extended and retracted positions of the visor members.

10. In combination with a vehicle having a top wall with an inner lining spaced inwardly therefrom, a visor holder mounted in concealed position within the space between said top wall and said lining, and a plurality of overlapping visor members supported by said holder for individual sliding movement into shielding position extending downwardly from said holder and into upwardly retracted position within the holder, said visor members being curved in the direction of their movement between extended and retracted positions, said visor members overlapping in a direction generally laterally relative to their paths of sliding movement to extended and retracted positions and each being adapted to be extended and retracted while maintaining the lateral overlap of the visor members substantially uniform throughout all extended and retracted positions of the visor members.

11. In combination with a vehicle having a top wall with an inner lining spaced inwardly therefrom, a visor holder mounted in concealed position within the space between said top wall and said lining, a plurality of overlapping visor members supported by said holder for individual sliding movement into shielding position extending downwardly from said holder and into upwardly retracted position within the holder, and means for individually holding said visor members in their extended positions, said visor members overlapping in a direction generally laterally relative to their paths of sliding movement to extended and retracted positions and each being adapted to be extended and retracted while maintaining the lateral overlap of the visor members substantially uniform throughout all extended and retracted positions of the visor members.

12. In combination with a vehicle having a windshield and a top wall provided with an inner lining spaced inwardly therefrom, a visor holder mounted in concealed position within the space between said top wall and said lining, and a plurality of overlapping visor members of a combined effective length to extend across substantially the entire windshield and supported by said holder for individual sliding movement into shielding position extending downwardly from said holder and into upwardly retracted position within the holder, said visor members overlapping in a direction generally laterally relative to their paths of sliding movement to extended and retracted positions and each being adapted to be extended and retracted while maintaining the lateral overlap of the visor members substantially uniform throughout all extended and retracted positions of the visor members.

13. In combination with a vehicle having a top wall with an inner lining spaced inwardly therefrom, a visor holder mounted in concealed position within the space between said top wall and said lining, a plurality of overlapping visor members supported in said holder for individual sliding movement into shielding position extending from said holder and into retracted position within said holder, said holder comprising a pair of plate members, and means spacing said plate members and guiding the visor members in their movement to extended and retracted positions, said visor members overlapping in a direction generally laterally relative to their paths of sliding movement to extended and retracted positions and each being adapted to be extended and retracted while maintaining the lateral overlap of the visor members substantially uniform throughout all extended and retracted positions of the visor members.

14. In combination with a vehicle having a top wall with an inner lining spaced inwardly therefrom, a visor holder mounted in concealed position within the space between said top wall and said lining, a plurality of overlapping visor members supported in said holder for individual sliding movement into shielding position extending from said holder and into retracted position within said holder, said holder comprising a pair of plate members, means spacing said plate members and guiding the visor members in their movement to extended and retracted positions, stop means between said plate members, and lateral lugs on the inner ends of said visor members for cooperation with said stop means to limit movement of said visor members to extended position, said visor members overlapping in a direction generally laterally relative to their paths of sliding movement to extended and retracted positions and each being adapted to be extended and retracted while maintaining the lateral overlap of the visor members substantially uniform throughout all extended and retracted positions of the visor members.

15. In combination with a vehicle having a top wall with an inner lining spaced inwardly therefrom, a visor holder mounted in concealed position within the space between said top wall and said lining, a plurality of overlapping visor members supported in said holder for individual sliding movement into shielding position extending from said holder and into retracted position within said holder, said holder comprising a pair of plate members, and means spacing said plate members and guiding the visor members in their movement to extended and retracted positions, said visor members and said plate members being curved in the direction of movement of said visor members between their extended and retracted positions, said visor members overlapping in a direction generally laterally relative to their paths of sliding movement to extended and retracted positions and each being adapted to be extended and retracted while maintaining the lateral overlap of the visor members substantially uniform throughout all extended and retracted positions of the visor members.

MERRITT W. GANO, Jr.